United States Patent
Liu et al.

(10) Patent No.: US 10,200,350 B2
(45) Date of Patent: Feb. 5, 2019

(54) METHODS AND APPARATUSES FOR LOCATION-BASED ACCESS MANAGEMENT

(75) Inventors: Wei Liu, Beijing (CN); Wenwei Xue, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/423,778

(22) PCT Filed: Sep. 4, 2012

(86) PCT No.: PCT/CN2012/080975
§ 371 (c)(1),
(2), (4) Date: Feb. 25, 2015

(87) PCT Pub. No.: WO2014/036689
PCT Pub. Date: Mar. 13, 2014

(65) Prior Publication Data
US 2015/0244692 A1    Aug. 27, 2015

(51) Int. Cl.
*H04L 29/06*    (2006.01)
*G06F 21/10*    (2013.01)
(Continued)

(52) U.S. Cl.
CPC .......... *H04L 63/0492* (2013.01); *G06F 21/10* (2013.01); *H04W 4/02* (2013.01);
(Continued)

(58) Field of Classification Search
CPC ... H04L 63/0492; H04L 9/0872; H04L 63/04; H04L 63/0428; H04L 63/0853;
(Continued)

(56) References Cited

U.S. PATENT DOCUMENTS

| 7,505,760 B2 | 3/2009 | Hurst et al. |
| 7,761,465 B1 * | 7/2010 | Nonaka .................. G06F 21/10 707/770 |

(Continued)

FOREIGN PATENT DOCUMENTS

| CN | 1964479 A | 5/2007 |
| CN | 101114901 A | 1/2008 |

(Continued)

OTHER PUBLICATIONS

"Specification of the Bluetooth System", Jun. 30, 2010, Specification vol. 0. pp. 1339-1341.*
(Continued)

*Primary Examiner* — Hadi S Armouche
*Assistant Examiner* — Alexander R Lapian
(74) *Attorney, Agent, or Firm* — Alston & Bird LLP (57) ABSTRACT

Methods and apparatuses for located-based content access control have been disclosed. A method may comprise: receiving, at a mobile device, from a short distance communication node, an identifier of the node; generating a device key for the mobile device based on the identifier of the node and an identifier of the mobile device; sending to the node the device key and the identifier of the mobile device, at least based on which the mobile device may be authenticated; and receiving, at the mobile device, from the node, one or more content keys, either encrypted or unencrypted, for decrypting content that has been or is to be saved in the mobile device.

25 Claims, 3 Drawing Sheets

(51) Int. Cl.
*H04W 12/04* (2009.01)
*H04W 4/02* (2018.01)
*H04W 12/08* (2009.01)
*H04W 4/80* (2018.01)

(52) U.S. Cl.
CPC ............. *H04W 4/80* (2018.02); *H04W 12/04* (2013.01); *H04W 12/08* (2013.01); *H04L 63/0853* (2013.01); *H04L 63/108* (2013.01); *H04L 2463/062* (2013.01); *H04L 2463/101* (2013.01)

(58) Field of Classification Search
CPC ..... H04L 63/10; H04L 63/107; H04L 63/108; H04L 9/0861; H04L 9/0866; H04L 2463/062; H04L 2463/101; H04W 12/04; H04W 12/08; H04W 4/008; H04W 4/02; H04B 5/0031; G06F 21/10
See application file for complete search history.

(56) References Cited

U.S. PATENT DOCUMENTS

| | | | | |
|---|---|---|---|---|
| 8,788,425 | B1* | 7/2014 | Diamond | G06Q 20/38215 705/51 |
| 8,943,605 | B1* | 1/2015 | Martin | H04L 9/0872 726/27 |
| 2004/0249768 | A1* | 12/2004 | Kontio | G06F 21/10 705/65 |
| 2005/0070248 | A1* | 3/2005 | Gaur | G11B 20/00086 455/410 |
| 2006/0059096 | A1 | 3/2006 | Pratul et al. | |
| 2006/0078112 | A1 | 4/2006 | Meyers | |
| 2006/0224519 | A1 | 10/2006 | Ahn | |
| 2007/0027809 | A1 | 2/2007 | Alve | |
| 2007/0124603 | A1* | 5/2007 | Yamamichi | G06F 21/10 713/194 |
| 2008/0147434 | A1 | 6/2008 | Durand et al. | |
| 2008/0229110 | A1* | 9/2008 | Balfanz | H04L 9/3263 713/176 |
| 2008/0244271 | A1* | 10/2008 | Yu | H04W 12/06 713/176 |
| 2010/0031018 | A1* | 2/2010 | Kurihara | G06F 21/10 713/153 |
| 2010/0054473 | A1* | 3/2010 | Kobayashi | H04L 9/0827 380/270 |
| 2010/0257360 | A1 | 10/2010 | Bae et al. | |
| 2010/0274859 | A1* | 10/2010 | Bucuk | H04L 63/08 709/206 |
| 2012/0102317 | A1* | 4/2012 | Mathur | G06F 21/10 713/156 |
| 2012/0208514 | A1* | 8/2012 | Park | G06F 3/0484 455/418 |
| 2013/0191887 | A1* | 7/2013 | Davis | H04L 63/0823 726/5 |
| 2014/0019759 | A1* | 1/2014 | Burmester | H04L 63/08 713/172 |

FOREIGN PATENT DOCUMENTS

| | | | | |
|---|---|---|---|---|
| CN | 101277185 A | | 10/2008 | |
| CN | 101719830 | * | 6/2010 | ............... H04B 5/00 |
| CN | 101719830 A | | 6/2010 | |
| CN | 101719830 B | * | 9/2012 | ............... H04L 9/32 |

OTHER PUBLICATIONS

International Search Report and Written Opinion received for corresponding Patent Cooperation Treaty Application No. PCT/CN2012/080975, dated Jun. 13, 2013, 12 pages.

* cited by examiner

METHODS AND APPARATUSES FOR LOCATION-BASED ACCESS MANAGEMENT

RELATED APPLICATION

This application was originally filed as Patent Cooperation Treaty Application No. PCT/CN2012/080975 filed Sep. 4, 2012.

FIELD OF THE INVENTION

The example and non-limiting embodiments of the present invention generally relate to the field of Digital Rights Managements, and more particularly, relate to methods, apparatuses, computer-readable storage medium and computer program products for location-based access management.

BACKGROUND OF THE INVENTION

This section introduces aspects that may help facilitate a better understanding of the invention(s). Accordingly, the statements of this section are to be read in this light and are not to be understood as admissions about what is in the prior art or what is not in the prior art.

Nowadays, various digital devices for presenting digital content are becoming more popular, such as mobile phone, PDA (Personal Digital Assistant), Tablet PC (Personal Computer), media player, or the like. The digital form of content makes it more easily to be distributed and propagated through network. The digital content may be, for example, music, video, image, game. The owners of content copyrights have gradually allayed concerns over unauthorized copying and distribution over a network, and they have now licensed content providers to copy and distribute digital versions of their copyrighted music, videos, images, games, etc. over the internet.

Content providers may like to add Digital Rights Management (DRM) to their authorized content, for example, enabling access control and preventing illegal distribution of the content. A typical content access scenario in the real world is location-based (or spatially-constrained) experience or consumption. For example, a user could freely access content within a specific place (e.g., experience store, hotel, coffee café, bar, club), with or without a fee; the user could not access the content any more when he or she leaves the place.

There are many example scenarios where a location-based access management may be desired. As an example, an experience store (for content and/or device) could allow a user to download and try a full-version of a paid mobile game when and only when the user is detected to be inside the store. As another example, a multimedia experience store could allow a user to download and feel vividly the effects of ringtones, wallpapers or screensavers on his or her own mobile devices before payment. Of course, such free experience is only provided when the user is in the store and the trial content must become inaccessible when the user goes out. As a further example, a recreation spot could provide customers free or almost free content consumption as a kind of attractive supplement to its service. For example, in a coffee café, a user could freely download and listen to selected songs of his or her preference when enjoying coffee. In a hotel, a user could download songs or movies to his or her mobile device and play them when/wherever he or she likes from within the hotel, e.g., from a lobby, a swimming pool, a sauna, a hot spring spot.

There are several known solutions for those above scenarios where a location-based access management is desired. One solution is to use on-site devices. A user can experience a piece of content using a device that is provided by the place, such as trying a mobile phone in a retail store with a little preloaded content. However, users are constrained to use a limited number of devices that are available in the place. The waiting time for a device may be long if a large number of customers are waiting. Also, the place may need to pay a considerable amount of maintenance charge for the devices that it provides.

Another solution is in-memory content delivery in a streaming manner. Specifically, all or part content is streamed into the random access memory (RAM) of a user's mobile device continuously over time for viewing and playing. With such solution, a user could use his or her own personal device. However, the content is disallowed to be permanently stored. Thus, the user has to re-download the content again and again if it is removed from the RAM. The repetitive download will consume a large amount of network bandwidth and burden the content server. Further, content providers may be worried about potential copyright infringement via network snooping due to transmission of plain, unencrypted content.

SUMMARY OF THE INVENTION

Therefore, it would be desirable in the art to provide a solution for providing location-based access management for copyrighted content. Specifically, it would be desirable to provide a solution by which a user could use his or her personal mobile device to freely access any content provided at a specific place as long as the user (i.e., the mobile device) is physically located within the place. It would also be desirable to provide a solution that may disable content access (i.e., a user is refrained from viewing or playing the content) when the user goes out of the spatial coverage of the place. Further, it would be desirable to provide a solution that may strengthen security related to content access.

To better address one or more of the above concerns, in a first aspect of the invention, there is provided a method, comprising: receiving, at a mobile device, from a short distance communication node, an identifier of the node; generating a device key for the mobile device based on the identifier of the node and an identifier of the mobile device; sending to the node the device key and the identifier of the mobile device, at least based on which the mobile device may be authenticated; and receiving, at the mobile device, from the node, one or more content keys, either encrypted or unencrypted, for decrypting content that has been or is to be saved in the mobile device.

In some embodiments, the method may further comprise disabling at least one of the content keys if a timer for the at least one content key expired.

In some embodiments, the identifier of the node may change over time.

In some embodiments, at least one of the content keys has been encrypted by using an encryption key that is generated based on the device key.

In some embodiments, the method may further comprise decrypting the content using at least one of the content keys into a random access memory of the mobile device; and clearing at least a portion of decrypted content from the random access memory once the portion of decrypted content has been rendered.

In some embodiments, the method may further comprise storing the content keys in a dynamic stack memory zone of the mobile device after the content keys are received.

In some embodiments, the method may further comprise sending to the node an identifier list of content to be decrypted; and wherein the content keys are directed to identifiers as included in the identifier list.

In a second aspect of the invention, there is provided a method, comprising: sending, to a mobile device, an identifier of a short distance communication node; receiving, from the mobile device, a device key for the mobile device and an identifier of the mobile device, wherein the device key is generated based on the identifier of the node and the identifier of the mobile device; authenticating the device at least based on the device key and the identifier of the mobile device; and sending, to the mobile device, one or more content keys, either encrypted or unencrypted, for decrypting content that has been saved or is to be in the mobile device.

In some embodiments, the method may further comprise configuring a timer for at least one of the content keys which disables the at least one of the content keys if the timer expired.

In some embodiments, the method may further comprise updating the identifier of the node after a predefined period of time.

In some embodiments, the method may further comprise encrypting at least one of the content keys by using an encryption key that is generated based on the device key before the sending of the content keys.

In some embodiments, the method may further comprise receiving from the mobile device an identifier list of content to be decrypted; and wherein the content keys are directed to identifiers as included in the identifier list.

In some embodiments, the method may further comprise retrieving the one or more contents from a local storage or from a remote content server.

In a third aspect of the invention, an apparatus is provided, which comprises: a short distance communication module, at least one processor, and at least one memory including computer program code, wherein the at least one memory and the computer program code configured to, with the at least one processor and the short distance communication module, cause the apparatus at least to perform: receiving, from a short distance communication node, an identifier of the node; generating a device key for the apparatus based on the identifier of the node and an identifier of the apparatus; sending, to the node via the short distance communication module, the device key and the identifier of the apparatus, at least based on which the apparatus may be authenticated; and receiving, from the node via the short distance communication module, one or more content keys, either encrypted or unencrypted, for decrypting content that has been or is to be saved in the apparatus.

In a fourth aspect of the invention, an apparatus is provided, which comprises: a short distance communication module, at least one processor, and at least one memory including computer program code, wherein the at least one memory and the computer program code configured to, with the at least one processor and the short distance communication module, cause the apparatus at least to perform: sending, to a mobile device, an identifier of the short distance communication module; receiving, from the mobile device, a device key for the mobile device and an identifier of the mobile device, wherein the device key is generated based on the identifier of the short distance communication module and the identifier of the mobile device; authenticating the device at least based on the device key and the identifier of the mobile device; and sending, to the mobile device, one or more content keys, either encrypted or unencrypted, for decrypting content that has been or is to be saved in the mobile device.

In a fifth aspect of the invention, there is also provided an apparatus comprising: means for receiving, at a mobile device, from a short distance communication node, an identifier of the node; means for generating a device key for the mobile device based on the identifier of the node and an identifier of the mobile device; means for sending to the node the device key and the identifier of the mobile device, at least based on which the mobile device may be authenticated; and means for receiving, at the mobile device, from the node, one or more content keys, either encrypted or unencrypted, for decrypting content that has been or is to be saved in the mobile device.

In a sixth aspect of the invention, there is also provided an apparatus comprising: means for sending, to a mobile device, an identifier of a short distance communication node; means for receiving, from the mobile device, a device key for the mobile device and an identifier of the mobile device, wherein the device key is generated based on the identifier of the node and the identifier of the mobile device; means for authenticating the device at least based on the device key and the identifier of the mobile device; and means for sending, to the mobile device, one or more content keys, either encrypted or unencrypted, for decrypting content that has been or is to be saved in the mobile device.

In a seventh aspect of the invention, there is provided a computer-readable storage media having computer program code stored thereon, the computer program code configured to, when executed, cause an apparatus to perform actions in the method according to any one of embodiments of the first aspect or any one of embodiments of the second aspect of the present invention.

In a eighth aspect of the present invention, there is provided a computer program product comprising a computer-readable storage media according to the seventh aspect of the present invention.

Particular embodiments of the subject matter described in this specification can be implemented so as to realize one or more of the following advantages.

With particular embodiments of the techniques described in this specification, solutions for providing location-based access management for encrypted content stored on a mobile device have been provided. By using a device key associated with an on-site short distance communication node and a user's mobile device, it can ensure that the user's mobile device is within the place and has a valid identity. By configuring the content key with a timer, it can ensure to disable content access when the user leaves the place for a period of time. Additionally, by changing the identifier of the on-site short distance communication node dynamically, the security may be enhanced. Further, only encrypted content is allowed to be downloaded and stored onto a user mobile device, which alleviates the worries of content providers on illegal content distribution.

Other features and advantages of the embodiments of the present invention will also be understood from the following description of specific embodiments when read in conjunction with the accompanying drawings, which illustrate, by way of example, the principles of embodiments of the present invention.

BRIEF DESCRIPTION OF THE DRAWINGS

The above and other aspects, features, and benefits of various embodiments of the invention will become more fully apparent, by way of example, from the following detailed description and the accompanying drawings, in which.

Like reference numbers and designations in the various drawings indicate like elements.

DETAILED DESCRIPTION OF EMBODIMENTS

Hereinafter, the principle and spirit of the present invention will be described with reference to the illustrative embodiments. It should be understood, all these embodiments are given merely for the skilled in the art to better understand and further practice the present invention, but not for limiting the scope of the present invention. For example, features illustrated or described as part of one embodiment may be used with another embodiment to yield still a further embodiment. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As mentioned previously, there is a need for a solution for providing location-based access management for content stored on a mobile device. The basic idea of the present invention is to achieve location-based access control by using spatially-constrained content keys.

To ensure security and access control, all content that is provided by a target place are encrypted. Each piece of the content may correspond to a unique symmetric key for encryption/decryption. The key is user-independent and may be allocated by an authentication server equipped for the target place.

In this way, a user can download, e.g., in batch mode, all encrypted content from a content server provided by the target place. The user can store the content into a permanent storage either internal or external (e.g., a SSD card plugged-in) to his or her mobile device, instead of in a random access memory (RAM) of the mobile device. Thus, it can save the user trouble and network bandwidth of repetitive content download.

Besides, the content server could be restricted to be only accessible within the target place. For example, the content server could provide content download via a private Wi-Fi or local area network (LAN). Alternatively, the content server may even be publicly-accessible outside the target place, because the content is all encrypted and are of no use without decryption keys. Such arrangement could relax the spatial constraints of content download for user convenience. Also, distribution of the encrypted content is not prevented, because the copyright protection is ensured by the content encryption/decryption method as proposed in the present invention.

To determine that a user (or his or her mobile device) is present within the target place, one or more on-site short distance communication nodes are physically located in the target place. Short distance communication technologies may comprise various short range communication techniques, such as, Bluetooth™, WLAN (e.g., Wi-Fi), WUSB, UWB, ZigBee and UHF RFID, or various near field communication (NFC) techniques including machine readable mediums such as radio frequency identification (RFID), Infra-red (TR) communication, linear and 2-D (e.g., QR) bar code, optical character recognition (OCR) and various other types of visual, electronic and magnetic scanning. Normally, the short range communication does not need a user to come close to touch a certain device. However, the short range communication such as Bluetooth™ and Wi-Fi could not provide a precise location control and the signal may leak outside the place.

Preferably, the short distance communication node may be an NFC node or device. The use of an NFC node has many advantages. First, the NFC node has a very short NFC communication range, which grantees the location-based content access. In other words, a mobile device that touches an on-site NFC reader must be inside the place. Thus, there is no need for any indoor or outdoor localization unit on the mobile device. Second, compared to Wi-Fi or Bluetooth™, the NFC channel is harder to be sniffed. Third, the information to be transferred via the NFC node is small, and thus the instant NFC transmission delay would consume little user waiting time. Lastly, the NFC devices may be equipped in a mobile target place, e.g., a car, a ship or a plane. The NFC devices may be installed inside the moving place and provide accurate spatial constraints "relative" to the place coverage. Such location determination is more flexible than those based on absolute location points/regions (e.g., GPS coordinates).

A user may obtain, via NFC devices that are scattered within a target place, content keys for decrypting encrypted content which has been or is to be pre-downloaded and stored on his or her mobile device. In the following, an NFC node/device is taken as an example to illustrate the signal flow according to embodiments of the present invention. The skilled in the art should appreciate that other short distance channels, such as Bluetooth™ and Wi-Fi, are also applicable.

Figure 1:
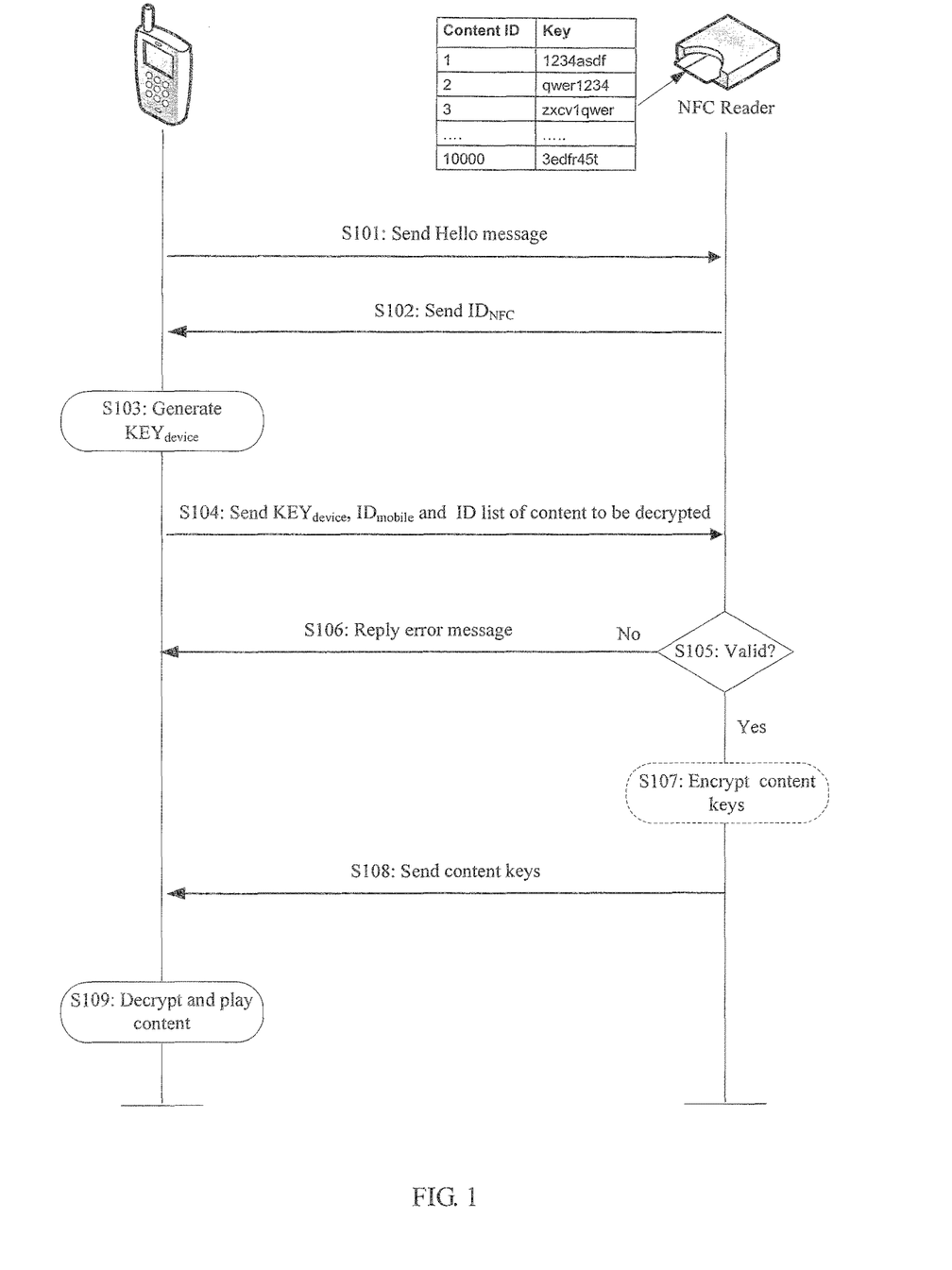
FIG. 1 illustrates an example signal flow according to one embodiment of the present invention.

FIG. 1 illustrates an example signal flow according to one embodiment of the present invention. In this embodiment, each NFC node (reader) in a target place stores all content keys locally, and thus the NFC node can directly distribute the requested content keys to a user mobile device. The content keys may be stored as a list, including content IDs and corresponding keys. Other data structure may also be used to store the content keys. FIG. 1 has shown an example table for content keys.

The method performed by a user mobile device may be implemented by a client application installed on the mobile device. The client application may be obtained from a backend web server via Internet, e.g., an application store, or from individual gateway computers located in the target place via wired USB or wireless communication channels such as Wi-Fi and Bluetooth™.

As shown in FIG. 1, at step S101, a user mobile device may send a message, e.g., Hello, to an NFC node located within a target place. The mobile device comprises an NFC communication module for communicating with the NFC node, for example touching or scanning the NFC node.

Then, at step S102, in response to the message, the NFC node sends its identifier to the mobile device. The identifier ($ID_{NFC}$) may be a sequence number which can identify the NFC node uniquely. For example, $ID_{NFC}$ may be 1010010110111010010.

Upon receiving the identifier of the NFC node, at step S103, the mobile device would generate a device key ($KEY_{device}$) based on the identifier $ID_{NFC}$ of the NFC node and its own identifier $ID_{mobile}$. The identifier of the mobile device may be a sequence number which could identify the mobile device or the user uniquely, for example the IMEI of the mobile device, or a unique service ID of the user.

Various algorithms may be used to generate the device key for the mobile device. For example, an encryption method like simple XOR, DES/AES, 3DES, or even PKI scheme may be selected. The selection depends on the balance between the computation cost and protection power. Those encryption algorithms are well known in the art, and the description thereof is omitted here. The present invention has no limitation in this regard.

Next, at step S104, the mobile device may send the device key $KEY_{device}$, the identifier of the mobile device $ID_{mobile}$ to the NFC node to request content keys.

Optionally, the mobile device may send an ID list of content to be decrypted along with the device key. As previously described, the mobile device may have batch downloaded or will download lots of encrypted content provided by the place. If the user merely wants to play some of the content, he/she could create an ID list of content which indicates the content to be played, i.e., to be decrypted, and the request is directed to the content keys for the content whose IDs are included in the ID list.

In one embodiment, the information sent in step S104 may be further encrypted. Preferably, the device key $KEY_{device}$ may be encrypted to enhance security.

Then, at step S105, the NFC node could authenticate the mobile device at least based on the received device key and the identifier of the mobile device.

The algorithm for generating the device key is known to both the mobile device and the NFC node. Once two of the three parameters (i.e., $KEY_{device}$, $ID_{NFC}$, $ID_{mobile}$) are known, the other one may be derived. Thus, the NFC node may recover its identifier ($ID_{NFC}$) based on the device key and the identifier of the mobile device. Thereafter, the NFC node may compare the recovered $ID_{NFC}$ with its original ID (i.e., the ID sent in step S102) to determine whether the mobile device (or user) is valid.

If the two IDs are identical, it can be determined that the mobile device (or user) is valid. Then, the method may proceed to step S107.

Otherwise, the NFC node can determine that the mobile device (or user) is invalid and reply the mobile device with an error message at step S106. Thereafter, the method will end.

Going on with step S107, having retrieved the content keys from its local storage, the NFC node could optionally encrypt the content keys to be sent. If an ID list of content to be decrypted was received from the mobile device, the encryption is directed to the content keys retrieved for the content whose identifiers are included in the ID list.

In one embodiment, the NFC node could post-process the device key $KEY_{device}$ to generate $E(KEY_{device})$. Then, the NFC node may encrypt the content keys to be sent by using the $E(KEY_{device})$. The algorithm for generating $E(KEY_{device})$ may be different from the algorithm for generating $KEY_{device}$. For example, a proprietary transform rule may be used to transform $KEY_{device}$ to $E(KEY_{device})$. As another example, the device key $KEY_{device}$ may be encrypted with predesigned seed by public encryption algorithm, such as DES/AES, 3DES, etc. The algorithm is system-defined and known by all components in the location-based access control system, e.g., the NFC nodes and a client application on the mobile device. Thus, the $E(KEY_{device})$ generated by every component is the same.

Similarly, various customized or known encryption algorithm may be used for the encryption of the content keys with the $E(KEY_{device})$. The present invention has no limitation in this regard.

Then, at step S108, the NFC node could send the encrypted or unencrypted content keys to the user mobile device. Upon receiving the content keys, the mobile device could decrypt and play the content at step S109.

In one embodiment, if the content keys are unencrypted, the mobile device could decrypt and play the content directly.

In another embodiment, if the content keys have been encrypted as above illustrated, the mobile device may generate the $E(KEY_{device})$ and restore the content keys accordingly. Then, the mobile device could decrypt the content with the content keys and play it. Those sensitive system parameters, e.g., the generated $E(KEY_{device})$ and the restored content keys, may be securely stored in a dynamic stack memory zone of the mobile device. From the security perspective, stealing the data variable $E(KEY_{device})$ is more difficult than stealing $KEY_{device}$. That is the major purpose why the $E(KEY_{device})$ instead of $KEY_{device}$ to encapsulate the content keys. Therefore theoretically, if the user closes the client application, all these variables and parameters will be cleared from the memory to prevent security leaks.

The content may be decrypted into a RAM of the mobile device in a streaming way and played by the client application on the mobile device. At least a portion of the decrypted content blocks may be cleared from the RAM once the portion of the decrypted content blocks has been rendered, while the encrypted content is still stored on a permanent storage.

Sometimes, a user could put the client application to continuously run in the background on his or her mobile device, which is supported by most current multi-thread mobile operating system (OS). By this way, the user could freely replay and enjoy the content whose decryption keys have been fetched previously, even if he or she has left the target place.

To solve the above problem, in further embodiments, the content keys may be configured with a timer, for example performed in step S107. If the timer for a content key is expired, the content key may be disabled. Such content key expiration mechanism can ensure that a user cannot decrypt and play the content any more if he/she has left the place for a while and is not able to refresh the content keys.

The value of the timer may be system-defined, which can associate with the content. For example, the value may be tens of minutes for an image or a screen saver, 1 hour for a mobile game, twice its length for a song or a movie, and so on. Such setting could leave sufficient time for a user to experience the content, but not forever. If the user wants to replay the content, he/she should obtain the content key again.

Normally, the ID of each NFC node/reader in a target place is static, which brings about certain security risk. In some further embodiments, the ID of the NFC node may be made to change over time, e.g., periodically or irregularly for security enhancement. In other words, the ID of the NFC node will be updated after a predefined period of time. Thus, the ID of the NFC node is essentially a dynamic, time-variant sequence number generated by the NFC node. For example, the ID may change every day or every several hours.

The mechanism of dynamic NFC ID introduces further barriers for a malicious pirate user to fake a device key by hacking tools. Even the pirate successfully breaks the generation algorithm for $KEY_{device}$, the fake client will be detected to be invalid as long as the pirate has not as well managed to correctly guess the dynamic NFC ID of a node in the place at this time (as performed in step S105).

Figure 2:
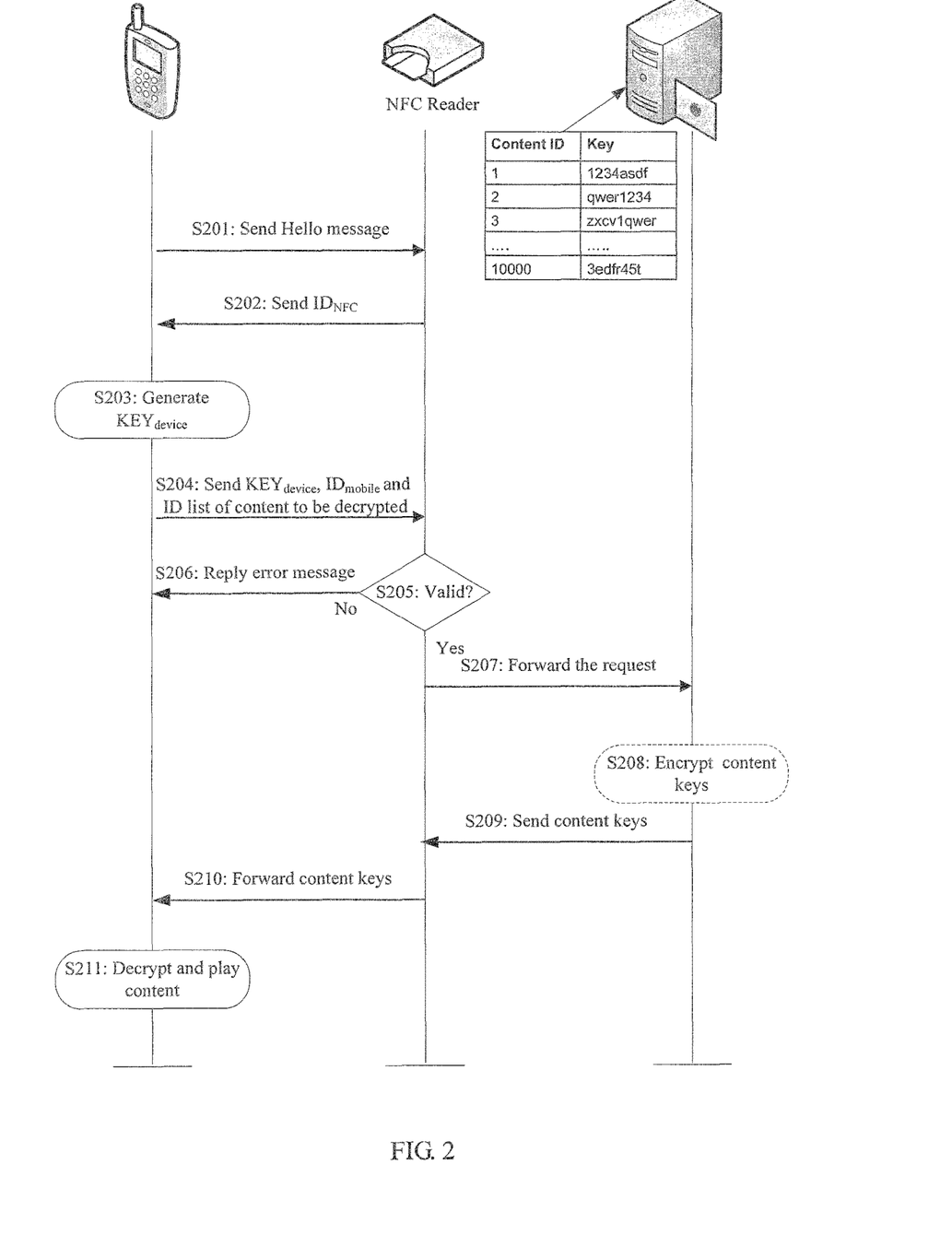
FIG. 2 illustrates an example signal flow according to another embodiment of the present invention.

FIG. 2 illustrates an example signal flow according to another embodiment of the present invention. Different from the embodiment as shown in FIG. 1, the NFC node (reader) in the target place has no content keys stored locally. The content keys are stored in a remote content server. Once a NFC node gets a request of content keys from a user mobile device, it will forward the request to a content server, obtain the content keys from the server, and return them to the user mobile device.

Such arrangement is more suitable for large content providers that hope to only keep the content keys in their own central server instead of scattering them onto the gateways of division places around the world.

The steps performed by the user mobile device in FIG. 2 are the same with those in FIG. 1, the authentication step performed by the NFC node in S205 in FIG. 2 is the same with the step S105 in FIG. 1, and thus the description thereof is omitted here.

As shown in step S207 of FIG. 2, having verified the user mobile device as valid, the NFC node could forward the request of the mobile device to the content server. For example, the NFC node could send the device key $KEY_{device}$ and the ID list of content to be decrypted to the content server. Obviously, the NFC node could also send some other parameters, e.g., its ID, to the content server for identify itself.

Then, at step S208, the content server could retrieve from its local storage the content keys to be sent according to the ID list, and optionally encrypt the retrieved content keys. Similar to the step S107 performed by the NFC node, the content server could post-process the device key $KEY_{device}$ to generate $E(KEY_{device})$ and in turn encrypt the content keys to be sent by using the $E(KEY_{device})$.

Next, at step S209, the content server could send the encrypted or unencrypted content keys to the NFC node, which will forward them to the mobile device at step S210. Upon receiving the content keys, the mobile device could decrypt and play the content at step S211, which is the same with step S109 in FIG. 1.

Embodiments of the present invention have thus provided an on-site key-based authentication scheme to enable location-based content access. The content keys are spatially-constrained within the target place and are forbidden to be distributed.

The device key $KEY_{device}$ aims to ensure that a user mobile device is "valid". "Valid" has two meanings. First, the mobile device has touched one NFC node physically located in a target place to get its $NFC_{ID}$. Second, the client application installed on the mobile device has a valid private algorithm module to generate $KEY_{device}$ from $ID_{mobile}$ and $ID_{NFC}$. Further, the device key $KEY_{device}$ may be used to generate an encryption key $E(KEY_{device})$, which is in turn used to encapsulate the content keys during transmission for security enhancement.

Figure 3:
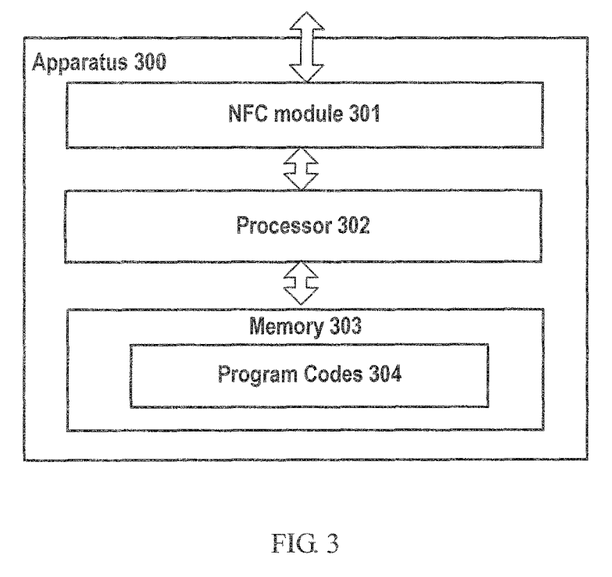
FIG. 3 is a schematic block diagram of an apparatus 300 that may be configured to practice example embodiments according to one aspect of the present invention.

FIG. 3 is a schematic block diagram of an apparatus 300 that may be configured to practice example embodiments according to one aspect of the present invention. The apparatus 300 may be a mobile device, which can be held by a user.

As shown in FIG. 3, the apparatus 300 may comprise a short distance communication module 301, e.g., an NFC module; at least one processor 302; and at least one memory 303 including computer program codes 304. The at least one memory and the computer program codes can be configured to, with the at least one processor, cause the apparatus to at least perform the methods as illustrated with reference to FIGS. 1-2.

Specifically, the apparatus may be caused to perform: receiving, from a short distance communication node, an identifier of the node; generating a device key for the apparatus based on the identifier of the node and an identifier of the apparatus; sending, to the node via the short distance communication module, the device key and the identifier of the apparatus, at least based on which the apparatus may be authenticated; and receiving, from the node via the short distance communication module, one or more content keys, either encrypted or unencrypted, for decrypting content that has been or is to be saved in the apparatus.

In some embodiments, the apparatus may be further caused to disable at least one of the content keys if a timer for the at least one content key expired.

In some other embodiments, the identifier of the node may change over time.

To strengthen the security, at least one of the content keys may be encrypted by using an encryption key that is generated based on the device key.

Further, the apparatus may be caused to perform: decrypting the content using at least one of the content keys into a random access memory of the apparatus; and clearing at least a portion of decrypted content from the random access memory once the portion of decrypted content has been rendered.

In some embodiments, the apparatus is further caused to store the content keys in a dynamic stack memory zone of the apparatus after the content keys are received.

In some other embodiments, the apparatus is further caused to send to the node an identifier list of content to be decrypted, wherein the content keys are directed to identifiers as included in the identifier list.

Reference can be made to the above description with respect to FIGS. 1-2, where various operations of the apparatus 300 have been described in detail, and thus the description thereof is omitted herein.

Figure 4:
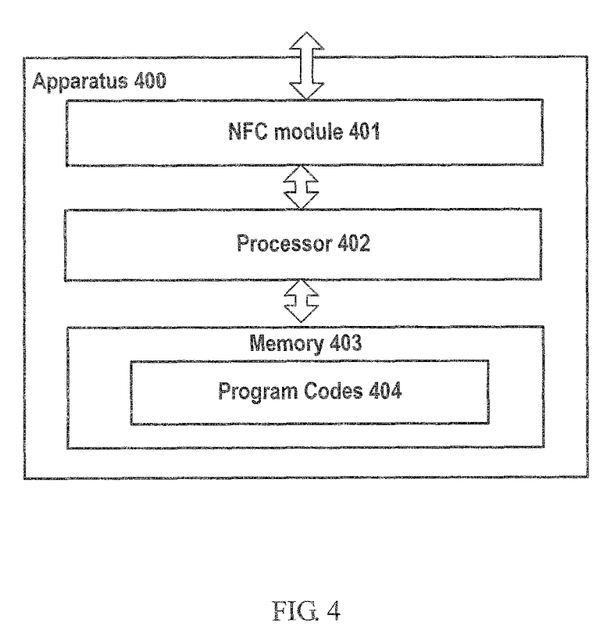
FIG. 4 is a schematic block diagram of an apparatus 400 that may be configured to practice example embodiments according to another aspect of the present invention.

FIG. 4 is a schematic block diagram of an apparatus 400 that may be configured to practice example embodiments according to another aspect of the present invention.

As shown in FIG. 4, the apparatus 400 may comprise a short distance communication module 401, e.g., an NFC module/node; at least one processor 402; and at least one memory 403 including computer program codes 404. The at least one memory and the computer program code can be configured to, with the at least one processor, cause the apparatus to at least perform the methods as illustrated with reference to FIGS. 1-2.

Specifically, the apparatus may be caused to perform: sending, to a mobile device, an identifier of the short distance communication module; receiving, from the mobile device, a device key for the mobile device and an identifier of the mobile device, wherein the device key is generated based on the identifier of the short distance communication module and the identifier of the mobile device; authenticating the device at least based on the device key and the identifier of the mobile device; and sending, to the mobile device, one or more content keys, either encrypted or unencrypted, for decrypting content that has been or is to be saved in the mobile device.

In some embodiments, the apparatus is further caused to perform configuring a timer for at least one of the content keys which disables the at least one of the content keys if the timer expired.

In some other embodiments, the apparatus is further caused to perform updating the identifier of the node after a predefined period of time.

In further embodiments, the apparatus is caused to perform: encrypting at least one of the content keys by using an encryption key that is generated based on the device key before the sending of the content keys.

In some further embodiments, the apparatus is further caused to perform: receiving from the mobile device an identifier list of content to be decrypted; and wherein the content keys are directed to identifiers as included in the identifier list.

Detailed operations of the apparatus 400 may reference to the above description with respect to FIGS. 1-2, and the description thereof is omitted herein. The skilled in the art could understand that, the apparatus 400 may be an NFC node/device and be configured to perform methods of the example embodiments of the present invention. In this case, the content keys may be stored in the NFC device locally. Alternatively, the apparatus 400 may be distributed among various networked elements, such as an NFC node and a content server, so as to perform the methods of the example embodiments of the present invention. In this case, the content keys may be stored in the content server.

Embodiments of the present invention have also provided apparatuses comprising means for performing each step as illustrated in conjunction with FIGS. 1 and 2. Therefore, for detailed operations of respective units in these apparatuses, please refer to the previous descriptions of the methods of the present invention with reference to FIGS. 1 and 2.

The present invention also provided a computer-readable storage media having computer program code stored thereon, the computer program code configured to, when executed, cause an apparatus to perform actions in the method as described hereinbefore. Further, there is provided a computer program product comprising a computer-readable storage media as provided in the present invention.

Example embodiments of the present invention have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment of the invention comprises at least one computer readable storage medium, on which the foregoing computer program instructions are stored. The computer readable storage medium can be, for example, an optical compact disk or an electronic memory device like a RAM (random access memory) or a ROM (read only memory).

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It should also be noted that the above described embodiments are given for describing rather than limiting the invention, and it is to be understood that modifications and variations may be resorted to without departing from the spirit and scope of the invention as those skilled in the art readily understand. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A method for enabling local access to content via a mobile device in response to the mobile device being within a communication range of a short distance communication node, the method comprising:

receiving, at the mobile device, from the short distance communication node, a unique identifier of the short distance communication node, wherein the unique identifier of the short distance communication node is a sequence number associated with an identifier of the mobile device which identifies the short distance communication node uniquely;

generating, by the mobile device, a device key for the mobile device based on the unique identifier of the short distance communication node and the identifier of the mobile device;

sending to the short distance communication node the device key, an identifier (ID) list of content to be decrypted, and the identifier of the mobile device, at least based on which the mobile device may be authenticated; and receiving, at the mobile device, from the short distance communication node, one or more content keys, encrypted by an encryption key that is generated based on the device key, for decrypting content that has been or is to be saved in the mobile device, wherein the one or more content keys are for the content whose identifiers are included in the ID list;

wherein the content has been or is to be received from a content server that is accessible to the mobile device when the mobile device is within the communication range of the short distance communication node.

2. The method of claim 1, further comprising disabling at least one of the content keys if a timer for the at least one content key is expired.

3. The method of claim 1, wherein the unique identifier of the short distance communication node changes over time.

4. The method of claim 1, further comprising:
decrypting the content using at least one of the content keys into a random access memory of the mobile device; and
clearing at least a portion of decrypted content from the random access memory once the portion of decrypted content has been rendered.

5. The method of claim 1, further comprising storing the content keys in a dynamic stack memory zone of the mobile device after the content keys are received.

6. The method of claim 1, wherein the mobile device is communicatively connected to the short distance communication node via a near field communication technique, and wherein the mobile device is communicatively connected to the content server via a short range communication technique.

7. A method for enabling local access to content via a mobile device in response to the mobile device being within a communication range of a short distance communication node, the method comprising:
sending, to the mobile device, a unique identifier of the short distance communication node;
receiving, from the mobile device, a device key for the mobile device, an identifier (ID) list of content to be decrypted, and an identifier of the mobile device, wherein the device key is generated based on the unique identifier of the short distance communication node and the identifier of the mobile device, and the unique identifier of the short distance communication node is a sequence number associated with the identifier of the mobile device which identifies the short distance communication node uniquely;
authenticating the mobile device at least based on the device key and the identifier of the mobile device; and
sending, to the mobile device, one or more content keys, encrypted by an encryption key that is generated based on the device key, for decrypting content that has been or is to be saved in the mobile device, wherein the one or more content keys are for the content whose identifiers are included in the ID list;
wherein the content has been or is to be received from a content server that is accessible to the mobile device when the mobile device is within the communication range of the short distance communication node.

8. The method of claim 7, further comprising configuring a timer for at least one of the content keys which disables the at least one of the content keys if the timer is expired.

9. The method of claim 7, further comprising updating the unique identifier of the short distance communication node after a predefined period of time.

10. An apparatus for accessing content, the apparatus comprising:
at least one processor, and
at least one memory including computer program code,
wherein the at least one memory and the computer program code are configured to, with the at least one processor, cause the apparatus to:
receive, from a short distance communication node, a unique identifier of the short distance communication node, wherein the unique identifier of the short distance communication node is a sequence number associated with an identifier of the apparatus which identifies the short distance communication node uniquely;
generate a device key for the apparatus based on the unique identifier of the short distance communication node and the identifier of the apparatus;
send, to the short distance communication node via a short distance communication module, the device key, an identifier (ID) list of content to be decrypted, and the identifier of the apparatus, at least based on which the apparatus may be authenticated; and
receive, from the short distance communication node via the short distance communication module, one or more content keys, encrypted by an encryption key that is generated based on the device key, for decrypting content that has been or is to be saved in the apparatus, wherein the one or more content keys are for the content whose identifiers are included in the ID list;
wherein the content has been or is to be received from a content server that is accessible to the apparatus when the apparatus is within a communication range of the short distance communication node.

11. The apparatus of claim 10, wherein the apparatus is further caused to perform:
disabling at least one of the content keys if a timer for the at least one content key is expired.

12. The apparatus of claim 10, wherein the apparatus is a mobile communication device.

13. An apparatus for controlling access to content, the apparatus comprising:
at least one processor, and
at least one memory including computer program code,
wherein the at least one memory and the computer program code are configured to, with the at least one processor, cause the apparatus to:
send, to a mobile device, a unique identifier of a short distance communication node, wherein the unique identifier of the short distance communication node is a sequence number associated with an identifier of the mobile device which identifies the short distance communication node uniquely;
receive, from the mobile device, a device key for the mobile device, an identifier (ID) list of content to be decrypted, and the identifier of the mobile device, wherein the device key is generated based on the unique identifier of the short distance communication node and the identifier of the mobile device;
authenticate the mobile device at least based on the device key and the identifier of the mobile device; and
send, to the mobile device, one or more content keys, encrypted by an encryption key that is generated based on the device key, for decrypting content that has been or is to be saved in the mobile device, wherein the one or more content keys are for the content whose identifiers are included in the ID list;
wherein the content has been or is to be received from a content server that is accessible to the mobile device when the mobile device is within a communication range of the short distance communication node.

14. The apparatus of claim 13, wherein the apparatus is further caused to perform:
configuring a timer for at least one of the content keys which disables the at least one of the content keys if the is timer expired.

15. The apparatus of claim 13, wherein the short distance communication node is a near field communication (NFC) device, and the content keys are stored in the NFC device locally.

16. The apparatus of claim 13, wherein the apparatus is the short distance communication node.

17. A non-transitory computer-readable storage media for enabling local access to content via a mobile device in response to the mobile device being within a communication range of a short distance communication node, the non-transitory computer-readable storage media having computer program code stored thereon, the computer program code configured to, when executed, cause an apparatus to perform actions comprising:
   receiving, at the mobile device, from a short distance communication node, a unique identifier of the short distance communication node, wherein the identifier of the node is a sequence number associated with an identifier of the mobile device which identifies the short distance communication node uniquely;
   generating a device key for the mobile device based on the unique identifier of the short distance communication node and the identifier of the mobile device;
   sending to the short distance communication node the device key, an identifier (ID) list of content to be decrypted, and the identifier of the mobile device, at least based on which the mobile device may be authenticated; and
   receiving, at the mobile device, from the short distance communication node, one or more content keys, encrypted by an encryption key that is generated based on the device key, for decrypting content that has been or is to be saved in the mobile device, wherein the one or more content keys are for the content whose identifiers are included in the ID list;
   wherein the content has been or is to be received from a content server that is accessible to the mobile device when the mobile device is within the communication range of the short distance communication node.

18. The non-transitory computer-readable storage media of claim 17 the actions further comprising disabling at least one of the content keys if a timer for the at least one content key is expired.

19. The non-transitory computer-readable storage media of claim 17, wherein the unique identifier of the short distance communication node changes over time.

20. The non-transitory computer-readable storage media of claim 17 the actions further comprising:
   decrypting the content using at least one of the content keys into a random access memory of the mobile device; and
   clearing at least a portion of decrypted content from the random access memory once the portion of decrypted content has been rendered.

21. The non-transitory computer-readable storage media of claim 17 the action further comprising storing the content keys in a dynamic stack memory zone of the mobile device after the content keys are received.

22. The non-transitory computer-readable storage media of claim 17 the actions further comprising:
   sending to the short distance communication node an identifier list of content to be decrypted; and wherein the content keys are directed to identifiers as included in the identifier list.

23. A non-transitory computer-readable storage media for enabling local access to content via a mobile device in response to the mobile device being within a communication range of a short distance communication node, the non-transitory computer-readable storage media having computer program code stored thereon, the computer program code configured to, when executed, cause an apparatus to perform actions:
   sending, to the mobile device, a unique identifier of a short distance communication node, wherein the unique identifier of the short distance communication node is a sequence number associated with an identifier of the mobile device which identifies the short distance communication node uniquely;
   receiving, from the mobile device, a device key for the mobile device, an identifier (ID) list of content to be decrypted, and an identifier of the mobile device, wherein the device key is generated based on the unique identifier of the short distance communication node and the identifier of the mobile device;
   authenticating the mobile device at least based on the device key and the identifier of the mobile device; and
   sending, to the mobile device, one or more content keys, encrypted by an encryption key that is generated based on the device key, for decrypting content that has been or is to be saved in the mobile device, wherein the one or more content keys are for the content whose identifiers are included in the ID list;
   wherein the content has been or is to be received from a content server that is accessible to the mobile device when the mobile device is within the communication range of the short distance communication node.

24. The non-transitory computer-readable storage media of claim 23 the actions further comprising configuring a timer for at least one of the content keys which disables the at least one of the content keys if the timer is expired.

25. The non-transitory computer-readable storage media of claim 23 wherein the actions further comprise updating the unique identifier of the short distance communication node after a predefined period of time.

* * * * *